US007287062B2

(12) United States Patent
Im et al.

(10) Patent No.: US 7,287,062 B2
(45) Date of Patent: Oct. 23, 2007

(54) HOME NETWORK SYSTEM AND METHOD FOR OPERATING THE SAME

(75) Inventors: Hyung Taik Im, Euiwang-si (KR); Chang Ho Kim, Seoul-si (KR)

(73) Assignee: LG Electronics Inc., Seoul (KR)

( * ) Notice: Subject to any disclaimer, the term of this patent is extended or adjusted under 35 U.S.C. 154(b) by 673 days.

(21) Appl. No.: 10/376,292

(22) Filed: Mar. 3, 2003

(65) Prior Publication Data

US 2004/0111490 A1 Jun. 10, 2004

(30) Foreign Application Priority Data

Dec. 6, 2002 (KR) ............... 10-2002-0077501

(51) Int. Cl.
  G06F 15/167 (2006.01)
  G06F 15/16 (2006.01)
(52) U.S. Cl. .................. 709/213; 709/217; 709/223
(58) Field of Classification Search ............ 379/90.01; 707/200, 204; 709/220, 230, 213, 217, 223; 717/168
See application file for complete search history.

(56) References Cited

U.S. PATENT DOCUMENTS

| 6,693,996 | B2* | 2/2004 | Mansfield | ............ 379/90.01 |
| 6,950,871 | B1* | 9/2005 | Honma et al. | ............ 709/226 |
| 6,976,066 | B1* | 12/2005 | Mouhanna et al. | ......... 709/223 |
| 7,042,988 | B2* | 5/2006 | Juitt et al. | ............ 379/88.17 |
| 7,055,008 | B2* | 5/2006 | Niles et al. | ............ 711/162 |
| 7,082,553 | B1* | 7/2006 | Wang | ............ 714/38 |
| 7,099,900 | B1* | 8/2006 | Bromley et al. | ............ 707/204 |
| 2004/0157544 | A1* | 8/2004 | Moon et al. | ............ 455/3.01 |

FOREIGN PATENT DOCUMENTS

CN  1 3 7 4 7 8 7  10/2002

* cited by examiner

Primary Examiner—Ario Etienne
Assistant Examiner—Hussein A El-chanti
(74) Attorney, Agent, or Firm—Greenblum & Bernstein, P.L.C.

(57) ABSTRACT

A home network system and a method for operating the same configured to be capable of recovering system and user data of a home server by allowing a user to press a recovery button when the home server cannot recover from a functional error of the home server. Initial system data of the home server, controlling and managing a home network connected to a plurality of home appliances, is automatically stored in an internal database as backup data. Data updated in the home server is periodically transmitted to a portal server connected to the home server through the Internet. Therefore, data, damaged due to a functional error of the home server, can be automatically recovered by using the backup data stored in the portal server.

11 Claims, 4 Drawing Sheets

HOME NETWORK SYSTEM AND METHOD FOR OPERATING THE SAME

BACKGROUND OF THE INVENTION

1. Field of the Invention

The present invention relates to a home network system and a method for operating the same, and more particularly to a home network system and a method for operating the same, the system and method being capable of automatically recovering system and user data of a home server by allowing a user to press a recovery button when the recovery of data, damaged due to a functional error of the home server configured in the home network system, cannot be performed.

2. Description of the Related Art

A configuration of a conventional home network system will be described with reference to FIG. 1.

As shown in FIG. 1, a home network N is constructed within a home or building. A manager of the home network N can input control commands into a plurality of home appliances h1 to h4 connected to the home network N, and can identify status information of the home appliances h1 to h4, which operate in response to the control commands. Since the home server 10 is connected to each home appliance having an input unit for receiving control commands and an output unit for outputting status information of the home appliance, the home server 10 can appropriately control the home appliances h1 to h4. The home server 10 can process control signals transmitted to and received from the home appliances h1 to h4 connected to the home network N. The home server 10 includes hardware having an Internet module such that it can be connected to an external Internet network I. In this specification, for example, an Internet-based refrigerator acts as the home server 10 as shown in FIG. 1.

The manager of the home network N inputs a control command through the home server 10, and then a home appliance transmits status information to the home server 10 after performing a control operation in response to the control command. To transmit the status information, the home appliances h1 to h4 include microprocessors embedded therein and the microprocessors process data transmitted to and received from the home network N.

The home appliances h1 to h4 such as a washing machine, a microwave oven, an electric light, etc. and the home server 10 such as the Internet-based refrigerator are connected through the home network N, and transmit to and receive data from the home network N. The home network N can be extended to the external Internet network I through the Internet module embedded in the home server 10. Thus, the home network can transmit to and receive data from remote electronic devices C1 and Cn.

Here, the home network system further includes a portal server 20 performing central management for home networks constructed in a plurality of homes. The portal server 20 is typically managed and operated by a constructor of the home network N. The portal server 20 drives a web page, such that the home appliances h1 to h4 connected to the home network N can be remotely controlled. Thus, a remote controller can transmit a control command to the home appliances h1 to h4 through an electronic device RC capable of accessing the web page, and identify the status information of the home appliances h1 to h4, which perform control operations in response to control commands, respectively.

However, when a system of the home server 10 cannot be recovered from a functional error of the home server 10 or a serious signal communication error generated in the home network system configured by the conventional home server 10 and the conventional portal server 20, the user of the home network N must request a home network provider or a repair center to recover the home server 10. A recovery request procedure is complicated and its costs and recovery time can be extensive.

If the function of the home server 10 is unstable, the home appliances h1 to h4 connected to the home network N cannot be controlled and remote control cannot be performed through the external Internet network I. Thus, the stability of the home server 10 is an important factor for the stability of the home network system. Further, user data, application program data, etc. can be damaged due to an unstable system of the home server 10. The user of the home network N must prevent functional errors of the home server 10 and must perform additional maintenance and management tasks such as updating the home server system, data backup, etc.

SUMMARY OF THE INVENTION

Therefore, the present invention has been made in view of the above problems, and it is an object of the present invention to provide a home network system and a method for operating the same, the system and method being capable of automatically performing backup of initial system data of a home server, controlling and managing a plurality of home appliances connected to a home network, storing the backup data in an internal database, periodically transmitting data updated in the home server to a portal server through an Internet network, and allowing the portal server to perform backup of the updated data, thereby automatically recovering system and user data of the home server when a functional error of the home server occurs, removing the need for manual maintenance and management tasks, saving recovery time and recovery costs, and ensuring the stability and convenience of the home network system.

In accordance with one aspect of the present invention, the above and other objects can be accomplished by the provision of a home network system, comprising: a home server for controlling and managing a home network connected to a plurality of home appliances; a portal server for communicating data with the home server through an Internet network; and a data manager for periodically transmitting data stored in the home server to the portal server such that data, damaged due to a functional error of the home server, can be automatically recovered, and managing backup data for the home server.

In accordance with another aspect of the present invention, there is provided a method for operating a home network system, comprising the steps of: a) when an initial system is constructed in a home server, performing backup of system data of a latest version and storing the backup system data in an internal database; b) periodically transmitting data updated in the home server to a portal server connected to the home server through an Internet network and performing backup of data of the home server; and c) receiving the backup data from the portal server when a functional error of the home server occurs and recovering the data of the home server.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
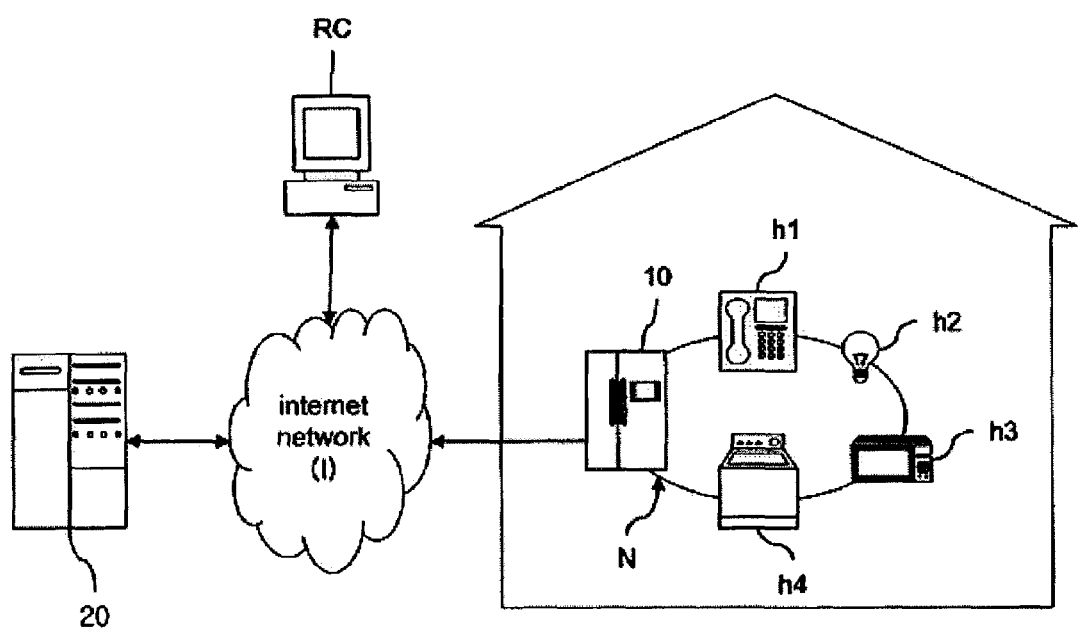
FIG. 1 is a view illustrating a conventional home network system.
Figure 2:
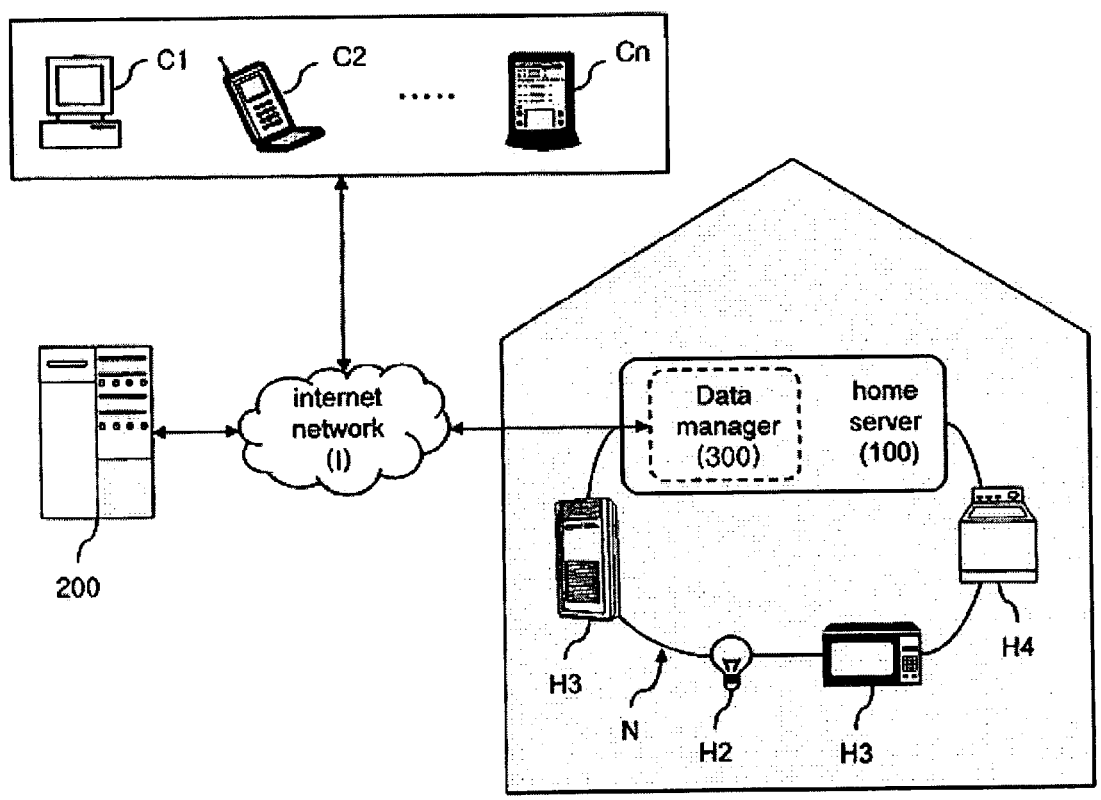
FIG. 2 is a view illustrating a configuration of a home network system in accordance with the present invention.

Now, preferred embodiments of the present invention will be described in detail with reference to the annexed drawings. FIG. 2 is a view illustrating a configuration of a home network system in accordance with the present invention.

The home network system basically includes a home server 100 for controlling operations of a plurality of home appliances H1 to H4 connected to a home network constructed in a home or building; and a portal server 200 connected to the home server 100 through an Internet network I for remotely controlling and monitoring the home network.

The portal server 200 drives a web page providing a remote control environment to control the home appliances in a home. The user of the home network system can access the web page using wired and wireless access devices C1 and Cn such as a computer, a mobile communication terminal, a PDA (Personal Digital Assistant), etc. The user gains the right to remotely control the home network system from the portal server 200 by inputting a user ID (Identifier) and a password into the portal server 200. Then, the user can access the home server 100 arranged in the home, identify status of the home appliances H1 to H4, and input a control command into the web page of the portal server 200.

The home server 100 has data processing capability capable of processing large-capacity data transmitted and received to and from the home appliances H1 to H4. The home server 100 includes an input unit (not shown) for allowing the user to input a control command into a home appliance and an output unit (not shown) for outputting status information such that the user identifies the status information of the home appliance.

The home server 100 can transmit to and receive data from the home appliances H1 to H4 through the home network N, thereby monitoring and controlling the status of the home appliances. Moreover, the home server 100 further includes an Internet module such that it can be connected to the external Internet network I. The home server 100 can transmit to and receive data from the portal server 200 through the Internet network I, thereby remotely controlling the home appliances.

The home server 100 can process transmission and reception data to control the home network system, and store the data in an internal database. The home server 100 stores updated user data in various application programs driven by the home server 100 associated with a task scheduler, a telephone dictionary and memo functions, which can be directly installed by the user.

A data manager 300 manages backup of data stored in the home server 100 to periodically transmit the backup data to the portal server 200 such that the data of the home server 100 can be automatically recovered when a functional error of the home server 100 occurs. The data manager 300 can be implemented as an internal module of the home server 100.

Figure 3:
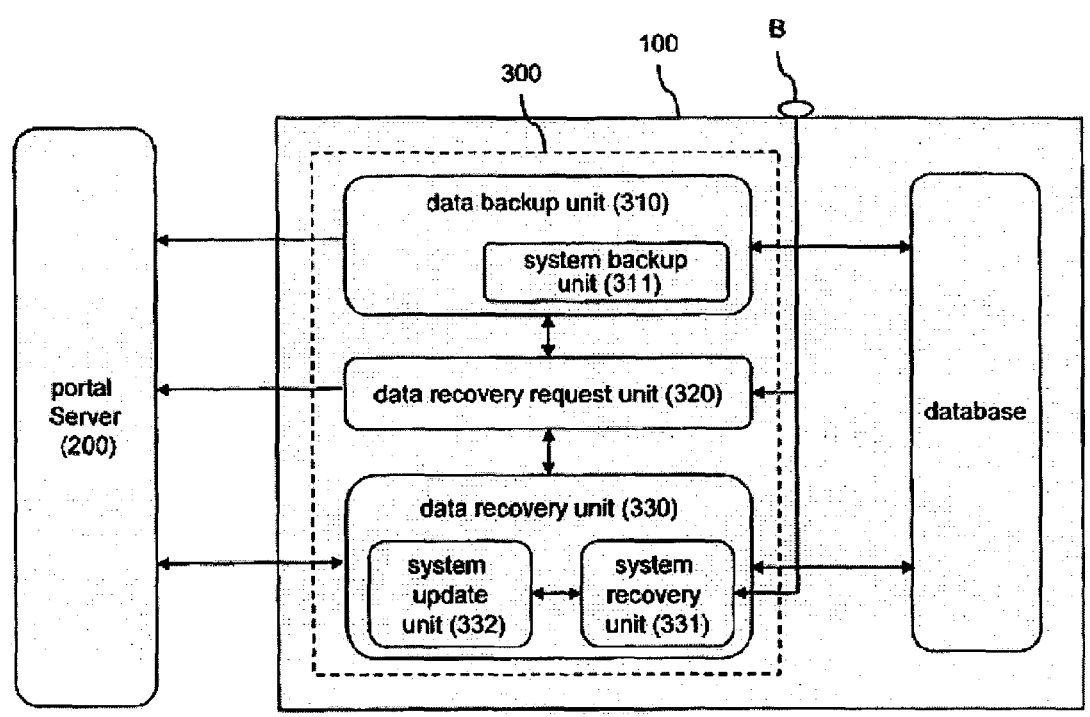
FIG. 3 is a view illustrating a data manager included in a home network system in accordance with the present invention.

Internal configurations of the data manager 300 will be described in detail with reference to FIG. 3.

The data manager 300 includes a data backup unit 310, a data recovery request unit 320 and a data recovery unit 330. First, the data backup unit 310 periodically transmits, to the portal server 200, data stored in the database of the home server 100 through the Internet module embedded therein such that the backup of data updated in the home server 100 can be safely performed. The data backup unit 310 further includes a system backup unit 311 for performing the automatic backup of system data including an OS (Operating System) of an initial version initially installed in the home server 100.

The home server 100 generates a packet having a unique ID and a password, allocated to the home network system, attached to a header or tail of the backup data to transmit the packet to the portal server 200. Thus, the portal server 200, connected to a plurality of home servers, classifies backup data on a home server basis and stores the classified backup data.

The data recovery unit 330 further includes a system recovery unit 331 for recovering a basic system using backup system data stored in the database by the system backup unit 311. After having recovered the system data of the initial version, the data recovery unit 330 receives backup user data stored in the portal server 200. If desired, the user can update the system data of the home server 100. To update the system data of the home server 100, the data recovery unit 330 further includes a system update unit 332 for downloading system data of a latest version from the portal server 200 and updating the system or system data of the home server 100.

The home server 100 further includes a recovery button B arranged on the exterior of the home server 100 such that a data recovery command can be directly inputted in response to a system error due to a functional error. When the recovery button B is pressed, a control signal is outputted to the system recovery unit 331 such that the backup system data stored in the database can be automatically recovered. Further, a control signal is outputted to the data recovery request unit 320 such that the damaged user data can be recovered after the system of the home server 100 has been recovered.

The data recovery request unit 320 receives a control signal according to the manipulation of the recovery button B and determines the existence of the functional error of the home server 100. When the home server 100 cannot recover the data damaged due to the functional error, the data recovery request unit 320 transmits a recovery request signal for recovering the damaged data to the portal server 200.

Figure 4:
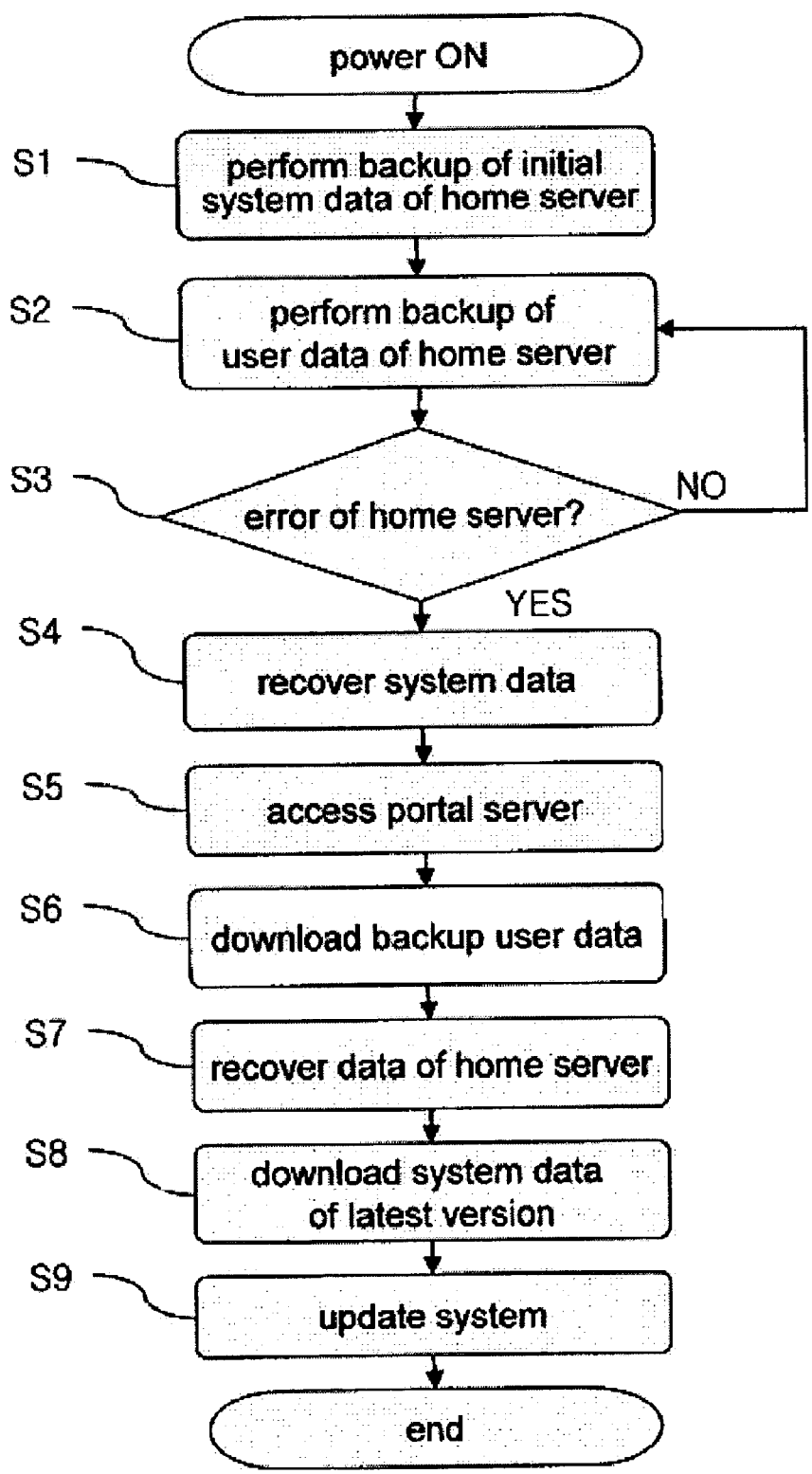
FIG. 4 is a flow chart illustrating a method for operating the home network system in accordance with the present invention.

A method for operating the home network system of the present invention configured as described above will be described with reference to FIG. 4.

At step S1, as the home server is initially connected to the home network constructed in a home or building, system data installed in the home server is automatically stored in an internal database as backup data.

At step S2, status data updated and stored according to the internal or external control of the home server or user data, generated in an application program driven by the home server, is periodically transmitted to the portal server, connected to the home server through the Internet network, and backup data of the home server is stored in the portal server.

At step S3, the existence of a functional error of the home server is determined. If a functional error of the home server occurs, the home server receives the backup data from the portal server to recover the data of the home server. Otherwise, backup of data updated in the home server is periodically performed.

At step S4, the basic system of the home server is recovered using the backup system data stored in the internal database of the home server at the above step S1 in order to recover the data of the home server.

After the operating system of the home server has been recovered, the home server accesses the portal server. At this time, the home server, accessing the portal server and requesting the backup data, transmits a unique ID and a password allocated to the home network system to the portal server. After the home server has gained the right to access the backup data stored in the portal server, it can download the backup data from the portal server at step S5.

The home server downloads the backup data stored in the portal server at the above step S2 from the portal server at step S6, and the home server can recover the system data and the user data of the home server by restoring the backup data in the database of the home server at step S7.

When the recovered system data corresponds to an old version, the home server downloads the system data of the latest version from the portal server at step S8, and can update the system or system data of the home server at step S9.

As apparent from the above description, the present invention provides a home network system and a method for operating the same, the system and the method being capable of conveniently and cost-effectively maintaining and managing a home server and improving the stability and reliability of the home network system by using a data manager for managing internal controls of a plurality of home appliances connected to a home network and recovering basic system data and user data of the home server when the data of the home server is damaged due to a functional error of the home server for transmitting to and receiving data from an external portal server such that the home appliances can be remotely controlled.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A home network system, comprising:
   a home server installed in a building for controlling and managing a home network connected to a plurality of home appliances;
   a portal server located outside the building for communicating data with the home server through the Internet; and
   a data manager for managing data backup for the home server by periodically transmitting, via the Internet, data stored in the home server to the portal server as backup data such that the backup data, when the data stored in the home server are damaged due to a functional error of the home server, can be automatically restored in the home server; and
   a recovery button arranged on an exterior of the home server such that a data recovery command can be directly input when a functional error of the home server occurs,
   wherein the recovery button is configured such that a control signal is output to the system recovery unit when the recovery button is pressed, to automatically recover the backup system data stored in the internal database,
   wherein the data manager comprises:
   a data backup unit for periodically transmitting the data stored in the home server such that backup of updated data stored in the home server can be performed;
   a data recovery request unit for determining existence of a functional error in the home server and transmitting a data recovery request signal for requesting a recovery of data to the portal server when the home server cannot recover the data damaged due to the functional error; and
   a data recovery unit for receiving the backup data from the portal server as a response to the data recovery request signal, and recovering data of the home server.

2. The home network system as set forth in claim 1, wherein the data manager is implemented as a module embedded in the home server.

3. The home network system as set forth in claim 1, wherein the data backup unit further comprises:
   a system backup unit for automatically performing backup of system data initially installed in the home server and storing the system data as backup system data in an internal database.

4. The home network system as set forth in claim 3, wherein the data recovery unit further comprises:
   a system recovery unit for recovering a basic system of the home server using the backup system data stored in the database.

5. The home network system as set forth in claim 1, wherein the data manager further comprises:
   a system update unit for accessing the portal server, downloading system data of a latest version associated with the home server from the portal server and updating a system of the home server.

6. The home network system as set forth in claim 1, wherein the recovery button is configured such that a control signal is output to the data recovery request unit to request the portal server to recover the damaged data.

7. The home network system as set forth in claim 1, wherein the portal server located outside the building is configured to store the backup data.

8. A method for operating a home network system, comprising:
   when an initial system is constructed in a home server installed in a building, performing backup of system data of an initial version and storing the system data as initial backup system data in an internal database;
   periodically transmitting data stored and updated by a data manager in the home server to a portal server connected to the home server through the Internet and performing backup of the transmitted data as backup data, the portal server being located outside the building;
   receiving the backup data from the portal server when a functional error of the home server occurs, and recovering data of the home server; and
   inputting a data recovery command initiated by a recovery button arranged on an exterior of the home server, when a functional error of the home server occurs,
   wherein the recovery button is configured such that a control signal is output to the system recovery unit when the recovery button is pressed, to automatically recover the backup system data stored in the internal databases,
   wherein the data manager comprises:

a data backup unit for periodically transmitting the data stored in the home server such that backup of updated data stored in the home server can be performed;

a data recovery request unit for determining existence of a functional error in the home server and transmitting a data recovery request signal for requesting a recovery of data to the portal server when the home server cannot recover the data damaged due to the functional error; and a data recovery unit for receiving the backup data from the portal server as a response to the data recovery request signal, and recovering data of the home server.

9. The method as set forth in claim 8, wherein said receiving comprises:

recovering a basic system of the home server by using the initial backup system data stored in the internal database;

accessing the portal server, downloading system data of the latest version for the home server from the portal server and updating system of the home server; and downloading the backup data from the portal server and restoring the downloaded backup data in the home server.

10. The method as set forth in claim 8, wherein the portal server located outside the building stores the backup data.

11. A home server installed in a building for controlling and managing a home network and a plurality of home appliances connected to the home network, the home server being configured to:

communicate with a portal server located outside the building, through the Internet;

periodically transmit data stored in by a data manager the home server to the portal server via the Internet as backup data;

request the portal server to send the backup data, when the data stored in the home server is damaged due to a functional error of the home server;

restore the backup data sent from the portal server to recover the damaged data; and input a data recovery command initiated by a recovery button arranged on an exterior of the home server when a functional error of the home server occurs, wherein the recovery button is configured such that a control signal is output to the system recovery unit when the recovery button is pressed, to automatically recover the backup system data stored in the internal database, wherein the data manager comprises:

a data backup unit for periodically transmitting the data stored in the home server such that backup of updated data stored in the home server can be performed:

a data recovery request unit for determining existence of a functional error in the home server and transmitting a data recovery request signal for requesting a recovery of data to the portal server when the home server cannot recover the data damaged due to the functional error; and a data recovery unit for receiving the backup data from the portal server as a response to the data recovery request signal, and recovering data of the home server.

* * * * *